May 9, 1944. H. W. HEY ET AL 2,348,435
COMBINED CLUTCH CONTROL AND GEAR SHIFTING MECHANISM
Filed June 11, 1941 3 Sheets-Sheet 2
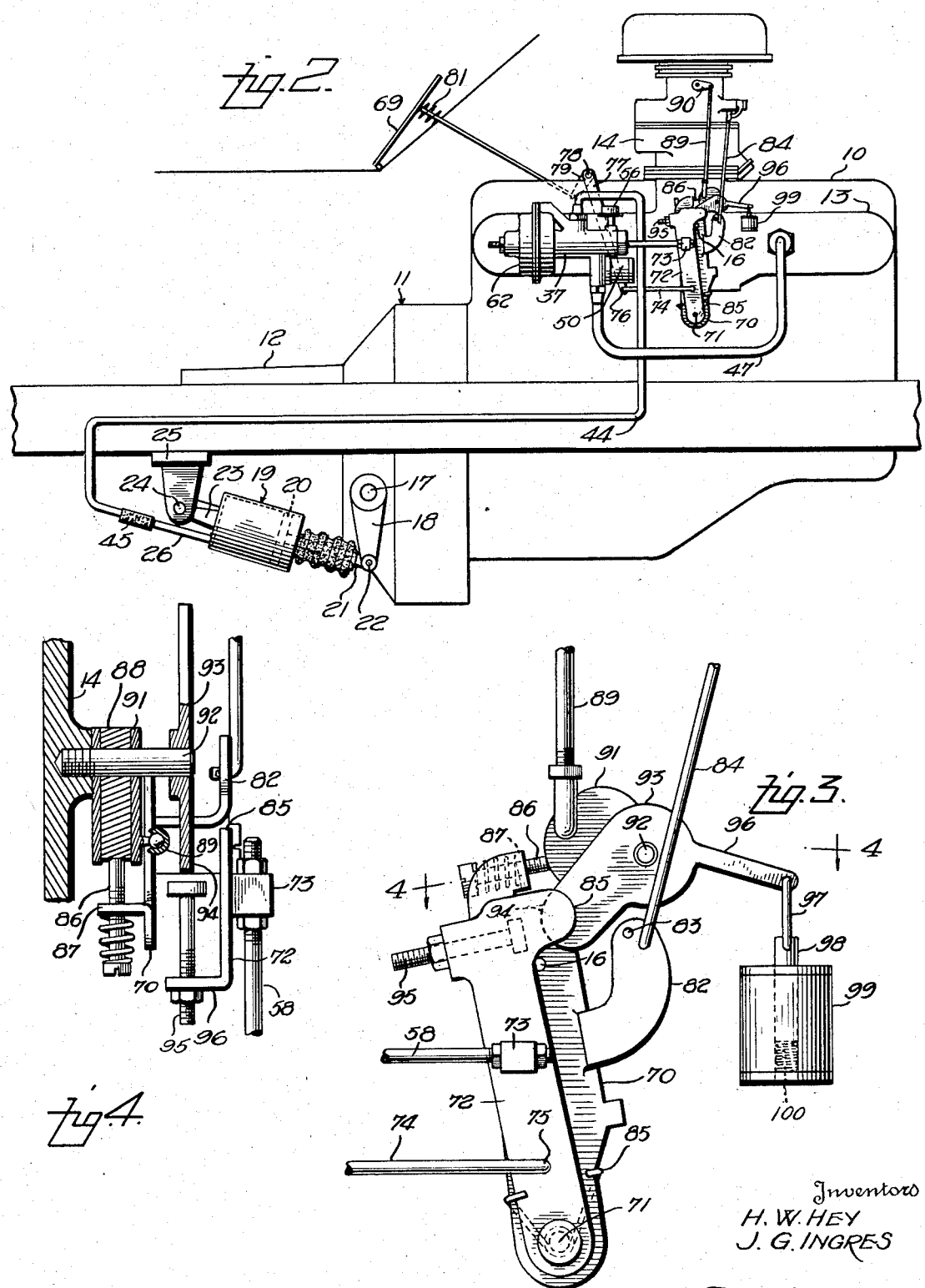
Inventors
H. W. HEY
J. G. INGRES

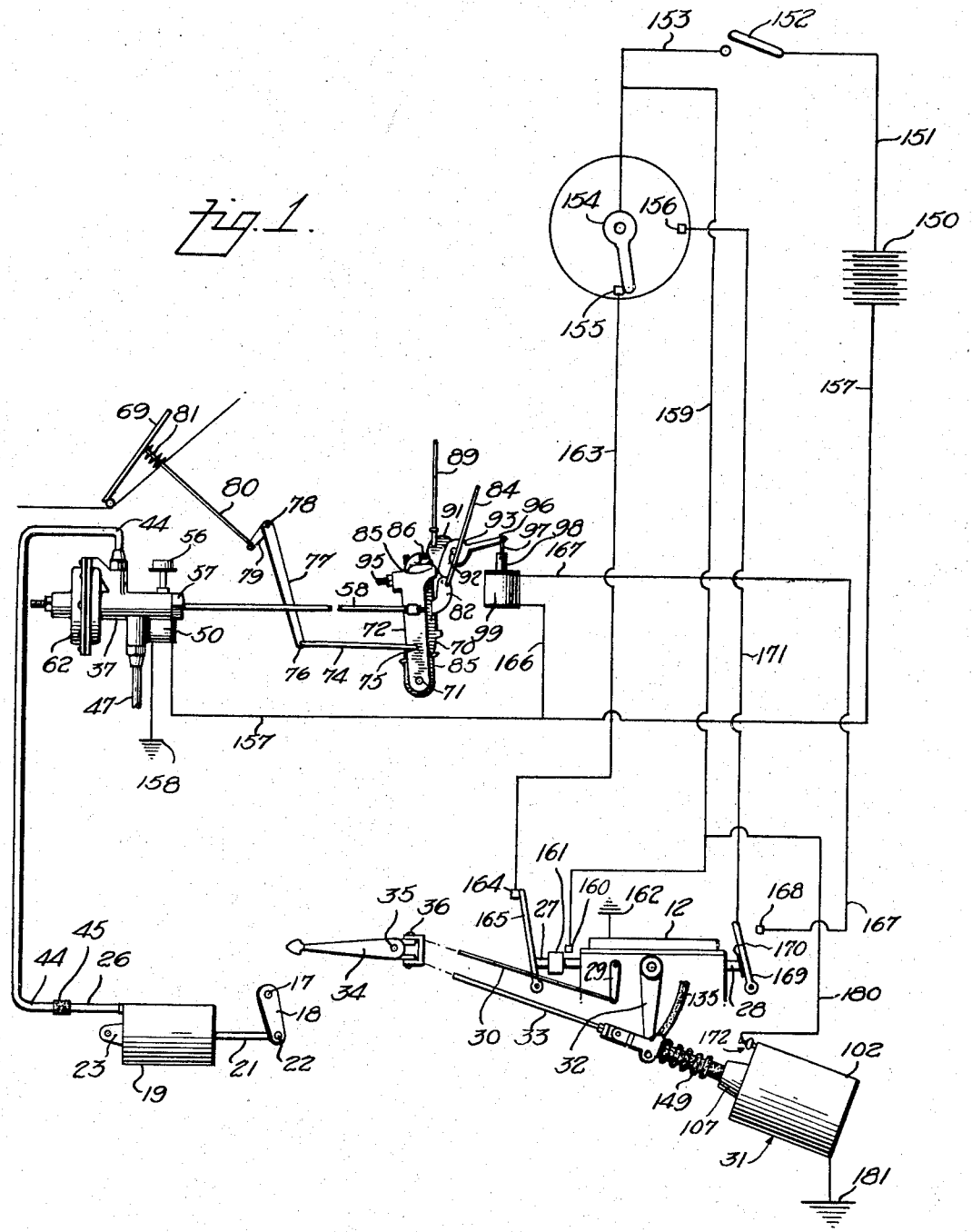

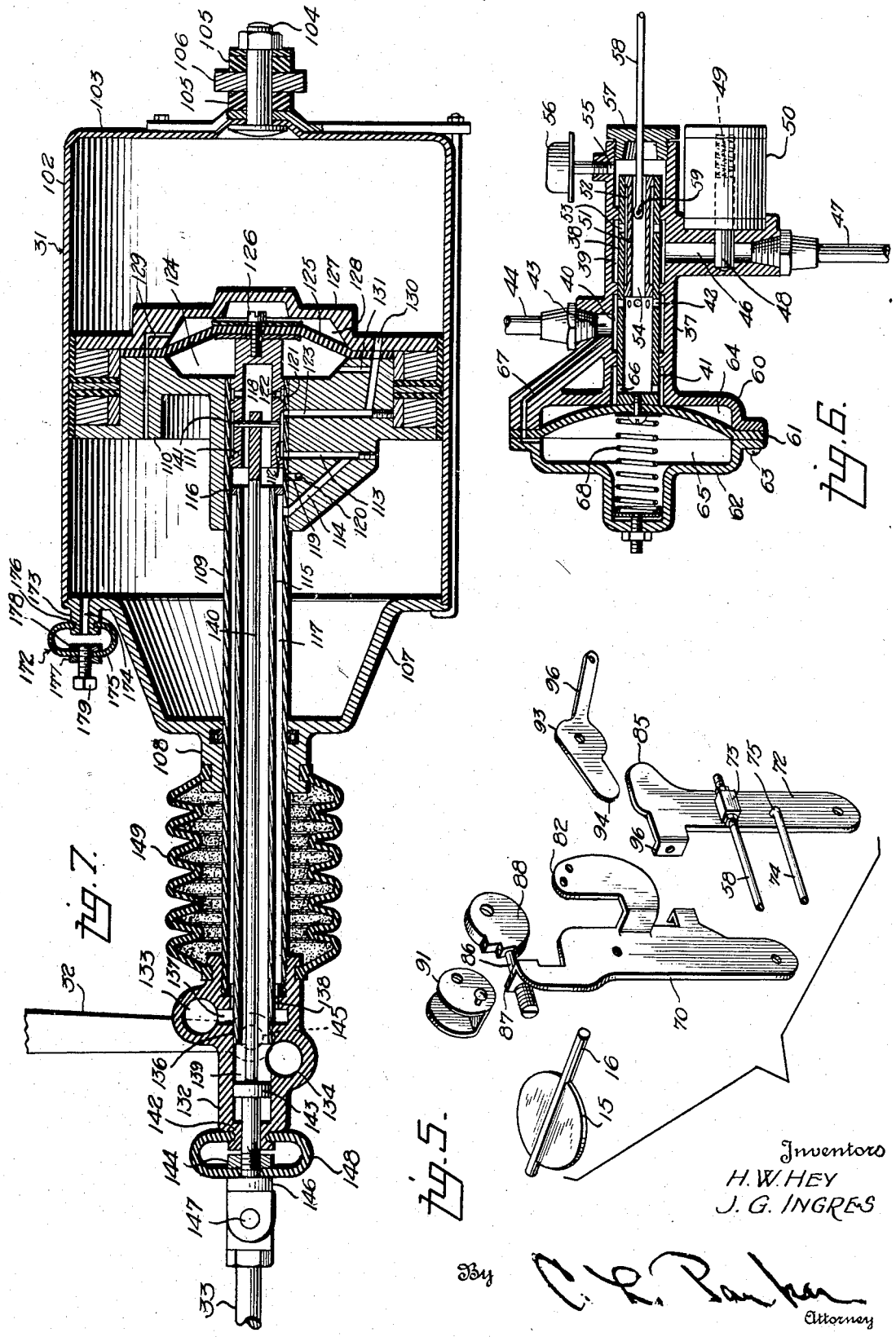

Patented May 9, 1944

2,348,435

UNITED STATES PATENT OFFICE 2,348,435

COMBINED CLUTCH CONTROL AND GEAR SHIFTING MECHANISM

Henry W. Hey, Richmond, Va., and Jeannot G. Ingres, Detroit, Mich., assignors to Automatic Shifters, Inc., Richmond, Va., a corporation of Virginia Application June 11, 1941, Serial No. 397,620

32 Claims. (Cl. 192—.01)

This invention relates to a combined clutch control and gear shifting mechanism for motor vehicles and is an improvement over the structure shown in the copending application of Jeannot G. Ingres, Serial No. 379,517, filed February 18, 1941.

In the prior patent to Edward G. Hill, No. 1,964,693, granted June 26, 1934, there is shown and described a particularly efficient control valve mechanism for a fluid pressure operated motor connected to a vehicle clutch for effecting disengagement of the clutch elements and controlling the engagement of such elements. The patented construction provides a follow-up control valve mechanism wherein the follow-up action is controlled through the medium of a pressure responsive member arranged so as to be influenced by pressures in the clutch motor. This follow-up arrangement is such that the mechanism of the patent, as shown therein, is extremely efficient for automatically retarding or arresting the movement of the clutch elements approximately at the point of initial engagement to prevent the grabbing of the clutch elements and the jerking or lunging of the vehicle.

The clutch control mechanism of the patent referred to was capable of perfect operation for the normal shifting operations in a motor vehicle transmission, but did not provide adequate automatic means through which certain shifting operations would be taken care of, such, for example, as a shift-down from high to second gear. In the copending application referred to there is disclosed a clutch control mechanism the control valve of which functions to effect clutch disengagement upon initial movement of the gear shift lever out of high gear position, and the clutch control valve mechanism functions after the shift has been made into second gear for causing automatic checking of the movement of the clutch elements substantially prior to initial engagement upon depression of the accelerator pedal. This provides a sufficient interval of time between the checking of the clutch elements and the engagement of such clements to permit substantial engine acceleration to take place, as is necessary when shifting from high to second gear in order to prevent the substantial jerking of the vehicle. This jerking action is due to engagement of the clutch elements while rotating at substantially different speeds, and the interval of time, which takes place in the structure of the copending application referred to permits engine acceleration to take place approximately to the point where rotational speeds of the clutch elements will be synchronized to permit smooth clutch engagement.

Such structure was found to be highly efficient in operation but possessed a single disadvantage in that it required the use of a switch in the gear shift handle to close a circuit which rendered the clutch control valve mechanism effective for energizing the clutch motor to disengage the clutch. The manufacture and installation of the switch referred to was found to be rather costly for quantity production of the apparatus.

We have found that a much cheaper control switch mechanism may be provided by mounting a simple stationary switch element in a position to be engaged by a movable switch member carried by an element of the transmission which is movable when a shift is being made out of high gear. The two switch elements, however, must be accurately placed in such positions as to be engageable upon initial movement of the shiftable element of the transmission prior to the point at which substantial force must be applied to move the shiftable element, otherwise it would require a substantial loading of the gear shift motor to close the switch elements and it is upon the latter operation that the energizing of the clutch control motor depends.

An important object of the present invention is to provide a motor vehicle clutch control and gear shifting mechanism wherein a simple and highly efficient mechanism is employed for energizing the clutch control motor to disengage the clutch, independently of the means normally provided for operating the clutch control mechanism, upon initial movement of the gear shift lever away from high gear position so as to prepare the mechanism for a shift from high gear into second gear.

A further object is to provide an apparatus of the character referred to wherein the clutch control mechanism is operable under every transmission condition, upon the releasing of the accelerator pedal, except when the vehicle is in high gear and travelling above a predetermined speed, and to combine with such mechanism an apparatus which is operable under the latter condition upon the releasing of the accelerator pedal and the imparting of a slight movement to the gear shift lever preparatory to a shift out of high gear, whereby the apparatus is prepared for a shift from high gear into second gear, if desired.

A further object is to provide such an apparatus wherein a switch for rendering the clutch control mechanism operative is so constructed and arranged as to be closed upon initial slight energization of the shifting motor instead of depending upon the relatively costly switch previously used in the gear shift handle and operable upon relative movement between two elements constituting such handle.

A further object is to provide such an apparatus wherein initial energization of the shifting motor when the gear shift handle is initially moved from the high gear position renders the clutch control mechanism automatically operative for effecting declutching, and to provide an auxiliary holding circuit in parallel with the switch referred to to retain the clutch control mechanism operative for holding the clutch disengaged as soon as appreciable gear shifting movement out of high gear position has taken place.

A further object is to provide a novel auxiliary control circuit for the clutch control mechanism comprising a pressure operable switch connected to that end of the fluid pressure operated gear shifting motor which is connected to a source of vacuum when a shift is to be made out of high gear, thus providing for the disengagement of the clutch when the vehicle is in high gear, and to combine with such a mechanism a device operable for checking the movement of the clutch elements at a point substantially in advance of the point of initial engagement of the clutch elements, after the shift has been made into second gear, to allow a substantial interval of time for vehicle engine acceleration to take place and thus substantially synchronize the speed of the clutch elements before they come into operative engagement.

Other objects and advantages of the invention will become apparent during the course of the following description.

In the drawings we have shown one embodiment of the invention. In this showing—

Figure 1 is a diagrammatic lay-out showing the various mechanical devices employed in the apparatus and the electrical control circuits therefor, Figure 2 is a side elevation of a motor vehicle power plant showing the clutch control mechanism and the throttle and control valve mechanism associated therewith, Figure 3 is an enlarged side elevation of the lever mechanism for operating the throttle and the clutch control valve mechanism, Figure 4 is a section taken substantially on line 4—4 of Figure 3, Figure 5 is a detail perspective view of the throttle and control valve lever mechanism showing the parts separated, Figure 6 is a detail sectional view of the clutch control valve mechanism, and, Figure 7 is a vertical longitudinal sectional view through the gear shifting motor showing the pressure operated switch associated therewith.

Referring to Figure 2 the numeral 10 designates a motor vehicle engine having the usual clutch indicated as a whole by the numeral 11 and comprising conventional clutch elements (not shown) engageable for transmitting power from the engine 11 through a conventional transmission 12 to drive the motor vehicle in the usual manner. The engine is provided with an intake manifold 13 to which fuel is supplied through a carburetor 14 controlled by a butterfly throttle valve 15 (Figure 5) carried by a shaft 16. The operation of this shaft will be referred to later.

The clutch elements are operable by a rock shaft 17 on one end of which is mounted a crank 18. A differential fluid pressure motor 19 has a piston 20 provided with a piston rod 21 pivoted as at 22 to the crank 18, and the motor 19 is carried by an arm 23 pivotally supported as at 24 by a bracket 25 carried by any suitable stationary portion of the vehicle. A vacuum pipe 26 is connected to one end of the motor 19 and the other end is vented to the atmosphere in the usual manner.

The transmission 12 may be of conventional type and provided with shiftable elements for establishing the usual gear ratios. In Figure 1 the transmission is shown as having one of the shiftable elements, namely, the one which provides second and high gears, and this shiftable element is provided with projecting ends 27 and 28. The shiftable member is movable back and forth to provide high or second gear, and as shown in Figure 1 the transmission is in high gear with the shiftable member moved to the left. The transmission is provided with a crank 29 operable by a rod 30 to select the shiftable member to be actuated and such shiftable member is adapted to be operated by energization of a double-acting fluid pressure motor 31 through the medium of a crank 32 constructed to actuate the selected shiftable member of the transmission in any desired manner. The motor 31 and associated elements will be described in detail later, and as will become apparent, the motor includes an internal follow-up valve mechanism operable by a rod 33.

The present invention is particularly adapted for use with transmissions of the type having a shift lever adjacent the steering wheel. Such lever is illustrated diagrammatically in Figure 1 and is indicated by the numeral 34. This lever is mounted to turn on a pivot 35 to permit movement of the lever parallel to the plane of the steering wheel and such movement is imparted in any desired manner to the rod 33. The lever 34 is adapted to swing on a pivot 36, perpendicular to the pivot 35, for movement toward and away from the steering wheel and such movement is utilized in any desired or conventional manner for actuating the rod 30 and thus selecting the desired shiftable member of the transmission. The particular motor 31 and the particular means for controlling the motor and the rod 30 by the lever 34 form no part of the present invention per se.

The valve mechanism for controlling the clutch motor 19 is shown in Figure 6. This valve mechanism preferably is of the pressure follow-up type and may be identical with the valve mechanism shown in the patent to Edward G. Hill, No. 1,964,693, referred to above. This valve mechanism comprises a cylindrical casing 37 in which is slidably arranged a valve 38, this valve being slidable in suitable lands in the valve housing to provide spaces 39, 40 and 41 for a purpose to be described. The valve 38 is provided with ports 42 constantly communicating with the space 40 and the latter space communicates through a port 43 with a pipe 44 connected to the vacuum pipe 26 of the clutch motor by a flexible coupling 45.

The space 39 communicates through a passage 46 with a pipe 47 leading to the intake manifold 13 (Figure 2) as the source of partial vacuum for operating the motor 19. A valve 48 is adapted to close the passage 46 and is urged to closed position by a spring 49. The valve 48 forms the armature of a solenoid 50 which is energizable in a manner and for a purpose to be described.

An internal valve 51 is slidable within the valve 38 and is provided at its ends with lands defining an elongated space 52 which is in constant communication with the vacuum space 39 through ports 53. The internal valve is provided with an axial passage 54 throughout its length and the end of the valve housing 32 to the right of the two valves 38 and 51 as viewed in Figure 6 communicates with the atmosphere through a port 55, preferably through a suitable air cleaner 56. The adjacent end of the valve housing is provided with a cap 57 through which a valve actuating rod 58 is slidable, this rod being connected to the internal valve 51 as at 59.

The opposite end of the valve housing 37 is provided with a circular enlargement 60 over which is arranged a diaphragm 61, and a cap 62 corresponding in diameter to the enlargement 60 and diaphragm 61 is secured through the diaphragm to the enlargement 60 by screws or the like 63. The spaces on opposite sides of the diaphragm 61 form chambers 64 and 65, the former of which communicates with the space 41 and thence through ports 66 with the interior of the adjacent end of the valve 38 which, in turn, is always in communication with the atmosphere through the axial passage 54.

The chamber 65 communicates with the port 43 through a passage 67 and a spring 68 urges the diaphragm 61 and hence the valve 38 to the right as viewed in Figure 6.

The valve operating rod 58 and the throttle valve 15 are operable by the engine accelerator pedal 69 (Figure 2) through the lever mechanism shown in Figures 3, 4 and 5. A lever 70 is connected to the throttle shaft 16 and is pivotally connected at its lower end as at 71 to a second lever 72, and this lever is connected by a swivel 73 to the valve actuating rod 58. A rod 74 is pivotally connected as at 75 to the lever 72 and is connected at its other end as at 76 to one arm 77 of a bell crank lever pivoted intermediate its ends as at 78 and having a shorter arm 79 connected by a rod 80 to the accelerator pedal 69, the latter pedal being urged upwardly to the idling position by a conventional spring 81. Depression of the accelerator pedal obviously rocks the bell crank lever arms 77 and 79 in a counterclockwise direction, thus moving the rod 74 to the right (Figures 1, 2 and 3) to move the valve actuating rod 58 in the same direction.

The lever 70 is provided with an offset arm 82 (Figures 3 and 5) having a pair of openings 83 into either of which is connected a rod 84 leading to the usual carburetor accelerator pump (not shown). The upper end of the offset arm 82 is arranged in the plane of and engageable by a projection 85 formed on the lever 72. Thus the lever 72 is turnable on the axis of the pin 71 until the projection 85 engages the arm 82, after which the two levers turn as a unit on the axis of the throttle shaft 16. When opposite movement is transmitted to the lever 72 by the accelerator-operated rod 74, the two levers will turn as a unit on the axis of the throttle shaft 16 until the idling position of the lever 70 is reached, after which the lever 72 will turn in a counterclockwise direction about its pivot 71 until it returns to its normal position shown in Figure 3. A torsion spring 85 tends to restore the normal relative positions of the levers 72 and 74.

Turning movement of the lever 70 in a clockwise direction to the idling position is limited by a screw 86 threaded in a lateral projection 87 formed on the upper end of the lever 70 and engageable with a toothed cam 88 operable by a rod 89 connected at its upper end to a crank 90 (Figure 2) forming a part of the automatic choke mechanism of the carburetor. The rod 89 imparts movement to the cam 88 by a device 91 of conventional type mounted on a stub shaft 92 carried by an adjacent portion of the carburetor 14. As the rod 89 moves downwardly incident to the heating of the engine 10, the screw 86 will remain in contact with the same tooth of the cam 88 pending depression of the accelerator pedal in the usual manner.

The shaft 92 supports a cam plate 93 having a cam end 94 movable to the operative position shown in Figure 3 in a manner to be described. When the cam 94 is in such position it is engageable with the head of a screw 95 threaded in a lateral offset 96 formed on the lever 72. Under such conditions the head of the screw 95 will engage the cam end 94 at an earlier point than the projection 85 would engage the arm 82, thus limiting independent turning movement of the lever 72 with respect to the lever 70 when the accelerator pedal is depressed.

The cam plate 93 is provided with a projecting arm 96 connected to the upper end of a link 97, the lower end of this link being connected to the armature 98 of a solenoid 99. The armature 98 is urged upwardly by a spring 100, this spring operating to urge the cam end 94 downwardly to an inoperative position. The solenoid 99 is energized to turn the cam end 94 to the operative position shown in Figure 3.

One suitable type of gear shifting motor for use with the apparatus is shown in Figure 7. This motor is of the double-acting differential fluid pressure type operable by the partial vacuum of the intake manifold, and a drop in pressure in one end of the motor is utilized in a manner to be described for energizing the solenoid 50 to thus permit the controlling of the clutch motor 19 by the accelerator pedal, as will be described. The gear shift motor, indicated as a whole by the numeral 31, comprises a cylinder 102 having an integral head 103 at one end provided with a stud 104 extending through deformable washers 105 and through a stationary bracket 106 by means of which the motor is supported, the washers 105 permitting the slight swinging movement of the motor necessary during its operation as will become apparent. The opposite end of the cylinder 102 is provided with a head 107 having a bearing 108 slidably supporting a tubular piston rod 109 to the inner end of which is connected a piston 110. A valve 111 is provided intermediate its ends with an elongated space 112 in constant communication with a passage 113 in the piston and this passage communicates with another passage 114 leading into the interior of the tubular piston rod 109. A tube 115 is arranged in and spaced from the piston rod 109 and is closed at its inner end as at 116 to provide a space 117 between the tube 115 and piston rod 109, and this space is connected to the source of vacuum in a manner to be described. The interior of the tube 115 is in constant communication with the atmosphere as will be described, and communicates with an axial recess 118 within the valve. The space between the valve 111 and the closure member 116, when the valve is in the position shown in Figure 7, communicates with a port 119 in the piston rod 109 and this port is connected by a passage 120 with the left hand end of the cylinder 102.

The valve 111 is provided with an annular groove 121 communicating with the interior of the valve through ports 122. The groove 121 accordingly is open to the atmosphere through the ports 122 and when the valve is moved to the left of the position shown in Figure 7, the groove 121 comes into communication with a port 123 formed in the piston rod 109. This port, in the position of the valve 111 in Figure 7, is in communication with the source of vacuum through passages 113 and 114, etc.

The piston is provided in its right hand face as viewed in Figure 7 with a recess 124 forming a pressure chamber and a diaphragm 125 is arranged over the adjacent end of the piston and is secured to the valve 111 as at 126. A cap 127 is secured against the diaphragm 126 and forms a pressure chamber 128. A passage 129 connects the chamber 128 to the left hand end of the cylinder as viewed in Figure 7 whereby the pressure in such end of the cylinder is duplicated in the chamber 128. The piston structure is provided with a passage 130 connected between the port 123 and the right hand end of the cylinder as viewed in Figure 7. A passage 131 connects the chamber 124 to the passage 130 whereby the pressure in the right hand end of the cylinder is duplicated in the chamber 124.

A head 132 is mounted on the external end of the tubular piston rod 109 and is provided with a pair of transverse passages 133 and 134. The passage 133 is connected to a pipe 135 (Figure 1) which is connected in any suitable manner (not shown) to the intake manifold 13. The passage 134 is in constant communication with the atmosphere. The tube 115 moves with the piston rod 109, as will be apparent, and the end of the tube 115 externally of the motor extends into and snugly fits an axial opening 136 formed in the head 132. The passage 133 is provided with a port 137 (Figure 7) communicating with the vacuum space 117 through an annular passage 138 around the tube 115. It will be apparent that the tube 115 extends to the left beyond the port 137 thus sealing this port from the interior of the tube 115. The space 139 to the left of the extremity of the tube 115 and within the head 132 forms an air space in constant communication with the air passage 134. Thus it will be apparent that atmospheric pressure is always present within the tube 115 and that the space 117 is always in communication with the source of partial vacuum.

A valve operating rod 140 has its inner end extending into the axial recess 118 within the valve 111 and is connected to the valve by a pin 141. The other end portion of the rod 140 extends through a bearing 142 formed in the end of the head 132 and on opposite sides of such bearing the rod 140 is provided with heads 143 and 144 to limit the movement of the rod 140 with respect to the head 132 and thus provide manual means for operating the head 132 to shift the gears upon a failure of power in the motor 131, as will become apparent. Any suitable means may be employed for connecting the head 132 to the gear shift crank 32. For example, the head 132 may be provided with an integral pin 145 (Figure 7) pivotally connecting the head 132 to the lower end of the shift crank 32.

The outer end of the rod 140 may be provided with a yoke 146 pivotally connected as at 147 to the adjacent end of the actuating rod 33. A rubber or similar sealing member 148 may seal the space between the yoke 146 and the adjacent end of the head 132 to exclude dust from the bearing 142. Similarly, a rubber or similar boot 149 may be connected between the head 132 and the bearing 108 to seal the latter against the entrance of dust or other foreign material.

The electrical control system for the apparatus is shown in Figure 1. A source of current 150, such as the vehicle battery, has one terminal connected by a wire 151 to a manual switch 152 which is normally closed but adapted to be opened to render the entire system inoperative, if desired. From the switch 152, a wire 153 leads to a switch arm 154 which is controlled by any conventional governor mechanism driven by the vehicle. The governor mechanism is so adjusted that the switch arm 154 engages a contact 155 when the vehicle speed is below any desired predetermined point, for example, twelve miles per hour, while the switch arm engages a second contact 156 and remains in engagement therewith for all vehicle speeds higher than such predetermined speed.

The other terminal of the battery is connected by a wire 157 to one terminal of the solenoid 50 and the other terminal of this solenoid is grounded as at 158. A circuit is adapted to be maintained closed through the solenoid 50 under all conditions except when the vehicle is in high gear and travelling above a predetermined speed. For this purpose, a wire 159 is connected between the wire 153 and a stationary contact 160 engageable with a sleeve 161 carried by the shift rail end 27. The latter element is shown in the high gear position in which case its engagement with the contact 160 is broken. As soon as the shift is started out of high gear, the sleeve 161 engages the contact 160 and it remains in engagement therewith under all other gear set conditions. The ring 161 is electrically connected to the gear set which is grounded as at 162, and accordingly a circuit is always completed to the solenoid 50 under all conditions except when the gear set is in high gear. Therefore, the solenoid 50 will maintain the valve 48 (Figure 6) in open position to connect the passage 46 to the intake manifold and thus render the clutch motor 19 subject to control by the accelerator-operated valve mechanism shown in Figure 6 under all conditions except when the gear set is in high gear.

The circuit through the solenoid 50 is also closed when the gear set is in high gear and the vehicle is travelling below the predetermined speed referred to, such as twelve miles per hour. Under the latter conditions the switch arm 154 will be in engagement with the contact 155 which is connected by a wire 163 to a stationary contact 164 and this contact is engaged by a switch arm 165 operable by the high gear shift rail end 27. Obviously the end 27 holds the switch arm 165 in engagement with the contact 164 so long as the gear set remains in high gear, and accordingly the contact 164 will be grounded through the switch 165, and through the gear set to the ground 162. Thus when the vehicle is in high gear and travelling below the predetermined speed referred to, the solenoid 50 will hold the valve 48 (Figure 6) in open position. When the vehicle is in high gear and travelling above said predetermined speed, the circuit for the solenoid 50 will be broken at the contact 155 and at the contact 160, and the solenoid 50 will be deenergized. Under such conditions the valve 48 (Figure 6) will be closed and thus the clutch motor cannot be energized and the clutch elements will remain in engagement. The purpose of this is to permit the accelerator pedal to be released without effecting declutching when the vehicle is travelling at a substantial speed in high gear, thus permitting the engine to be used as a brake.

The solenoid 99 is energizable for permitting engine acceleration when a shift down is to be made from high to second gear. One terminal of the solenoid 99 is connected by a wire 166 to the wire 157 while the other terminal is connected by a wire 167 to a stationary contact 168 engageable by a switch arm 169. This switch arm carries an insulating strip 170 engageable by the second gear shift rail end 28, whereby the shift into second gear will move the switch 169 into engagement with the contact 168. The circuit through the solenoid 99 is then completed through a wire 171 connected between the switch arm 169 and the contact 156, provided the vehicle is travelling above the predetermined speed referred to, and it is above such speed that it is desired to render the solenoid 99 operative for its intended purpose.

As previously stated, the ring 161 is engageable with the contact 160 as soon as the shift is started out of high gear. The purpose of this is to complete a circuit through the solenoid 50, as previously stated, and we have found that this type of circuit is advantageous over the closing of a circuit by movement of the gear shift lever as is done in the copending application of Edward G. Hill and Henry W. Hey, Serial No. 372,410 (now Patent No. 2,320,182, issued May 25, 1943), the advantage lying in the much cheaper construction and installation involved in the particular switch device employed. However, regardless of the advantage referred to, the switch device 160—161 is disadvantageous for the reason that if these elements alone are depended upon, they must be engaged upon the slightest movement of the shift rail end 27 out of high gear position to close the circuit through the solenoid 50 and thus effect immediate release of the clutch, when the accelerator pedal is in released position. This close arrangement of the elements 160 and 161 is such that ordinary jarring of the vehicle will sometimes close the circuit. If the elements 160 and 161 are sufficiently spaced to prevent such accidental engagement, these elements will not be brought into engagement and the clutch released until definite movement of the shift rail end 27 out of high gear takes place and this movement is possible, when the clutch elements are in engagement, only by putting a relatively heavy load on the motor piston 110 (Figure 7) of the gear shift motor and this heavy load will be reflected in the difficulty with which the gear shift lever 34 is movable.

To overcome the difficulty referred to, a switch device associated with the motor cylinder 102 is employed, this device being indicated as a whole by the numeral 172. The switch device 172 comprises a thimble 173 carried by the end of the cylinder 102 in which vacuum is established when the shift is to be made out of high gear. This thimble is provided with a passage 174 therethrough, as shown in Figure 7. A rubber or similar deformable bulb 175 has one side fitting into a groove 176 in the thimble 173 and has its other side fitted between nuts 177 and 178 carried by a screw 179. The inner end of this screw acts as a movable contact engageable with the adjacent end of the thimble 173 when partial vacuum is initially established in the adjacent end of the cylinder 102.

The switch thus provided is arranged in parallel with the switch comprising the elements 160 and 161. The screw 179 is connected by a wire 180 to the wire 159, and the thimble 173 is grounded on the motor cylinder 102 which, in turn, is shown in Figure 1 as being grounded at 181. Initial movement of the gear shift handle 84 to effect the shift out of high gear will reduce pressure in the left hand end of the cylinder 102, thus closing the circuit between the wire 180 and ground 181 and thus through the solenoid 50 to permit the releasing of the clutch independently of engagement of the ring 161 and 160, thus permitting the shift to be made out of high gear without substantial loading of the shift motor piston 110. As soon as the shift is started to any substantial extent, a parallel circuit will be closed across contact 160 and sleeve 161, and accordingly the circuit through the solenoid 50 will be maintained closed regardless of the operation of the switch device 172.

The operation of the apparatus is as follows:
The clutch control motor 19 and its control valve mechanism shown in Figure 6 operate in accordance with the disclosure in the patent to Edward G. Hill, No. 1,964,693, referred to above, while the lever mechanism shown in Figure 3 operates in accordance with the disclosure in the copending application of Edward G. Hill and Henry W. Hey, Serial No. 372,410 also referred to. Similarly, the gear shifting mechanism comprising the motor 31 and its control valve mechanism as shown in Figure 7 and the manually operable control mechanism therefor function in accordance with the disclosure in the patent to Henry W. Hey, No. 2,262,233. These mechanisms need not be completely described in detail as to their operating functions in view of the disclosures of said patents and said pending applications.

Assuming that the vehicle is to be started from a standstill and the engine 10 is running with the accelerator pedal 69 in idling position, the lever 70 (Figure 3) will be in idling position and the lever 72 will have been turned in a counter-clockwise direction about its pivot 71 to the position shown in Figure 3. The operator is thus able to move the gear shift lever 34 to effect the shift into low gear, this being done by lifting the lever 34 toward the steering wheel to operate the rod 30 and crank 29 to select the low and reverse gear shiftable element, and by then moving the handle 34 downwardly and rearwardly parallel to the plane of the steering wheel into the low gear position. The latter operation moves the valve 111 (Figure 7) to the right as viewed in Figure 7 to connect the vacuum passage 113 to the passage 123 thus connecting the right hand end of the motor cylinder 102 to the source of vacuum while air will be admitted into the other end of the motor through the port 119. Under such conditions air pressure will move the piston 110 to the right as viewed in Figure 7, this movement being a follow-up action with respect to the valve 111 as will be apparent. It will be remembered that the elements 160 and 161 are in engagement with each other under all conditions except when the vehicle is in high gear (which position is shown in Figure 1), and accordingly under the conditions being considered the clutch control valve mechanism (Figure 6) will be subject to operation by the accelerator pedal and by the lever mechanism shown in Figure 3. The completion of the circuit across elements 160 and 161 maintains the valve 48 (Figure 6) in open position, the circuit including wires 151, 153 and 159, elements 160 and 161, grounds 162 and 158, solenoid 50 and wire 157.

Thus with the accelerator pedal released, the valve 48 (Figure 6) will be held in open position by the solenoid 50 and the valve 51 will occupy a position to the left of the position shown in Figure 6 with the vacuum space 52 connected to the port 43 and thus with the pipe 44 and clutch control motor 19. The clutch will have been disengaged therefore, to permit the shift referred to into low gear. When the valve 51 is in the clutch releasing position the source of vacuum will be connected to the chamber 65 and the diaphragm 61 and valve 38 also will be to the left of the position shown in Figure 6. The shift into low gear having been made, the operator will depress the accelerator pedal, which operation swings the lever 72 (Figure 3) in a clockwise direction about the pivot 71 until the projection 85 contacts with the arm 82 beyond which point no independent movement of the lever 72 can take place. On the contrary, further depressing of the acceleraotr pedal will effect movement of the levers 70 and 72 as a unit to open the accelerator. The initial movement of the lever 72 provides for the operation of the valve 51 (Figure 6) to prepare the clutch elements for engagement approximately at the time movement is imparted to the lever 70 to rock the throttle shaft 16. This operation is fully described in the copending application of Hill and Hey No. 372,410.

As air is admitted into the clutch motor by movement of the valve 51 (Figure 6) to the right to uncover the ports 42 to the air passage 54, air will also be admitted through passage 67 into the chamber 65, thus progressively reducing differential pressures in the chambers 64 and 65 whereby the spring 68 acts to provide a follow-up action of the valve 38 with respect to the valve 51. Depression of the accelerator pedal continues until suitable vehicle acceleration has been attained, whereupon the operator will release the accelerator pedal to return the throttle to idling position and return the lever 72 to the position shown in Figure 3, these movements taking place while transmitting movement through the rod 58 to the valve 51 to again connect the clutch control motor to the source of vacuum and disengage the clutch preparatory to the shift into second gear.

The operations referred to are repeated for each shifting of the gears as will be obvious and during the usual shifting operations the clutch control mechanism and the gear shifting mechanism are separately and independently operable by the operator, the clutch control mechanism being operated by the accelerator and the gear shifting mechanism being operated by the shift handle 34. It will be apparent that the piston of the motor 31 will be at the right hand end of the cylinder 102 when the gear set is in low gear position. Upon the next shifting operation, the left hand end of the cylinder 102 as viewed in Figure 7 will be connected to the source of partial vacuum and this operation results in the collapsing of the bulb 175 and the consequent contacting of the screw 179 and thimble 173. The circuit through these elements, under the conditions described, however, will have been previously closed as indicated below, and accordingly no result will follow the engagement of the screw 179 and thimble 173. As previously stated, the circuit across the elements 160 and 161 (Figure 1) is always closed except when the vehicle is in high gear, and accordingly whenever the operator releases the accelerator pedal the clutch control mechanism will be subject to control solely by the valve mechanism in Figure 6, the valve 48 being opened at all times except when the vehicle is in high gear, and being adapted to be closed in high gear under conditions to be described. Accordingly it will be apparent that for all of the normal shifting operations, it merely is necessary for the operator to release the accelerator pedal, make the desired shift by operation of the handle 34, and then depress the accelerator pedal to effect clutch engagement and engine acceleration. When the shift is made into high gear the second and high gear shiftable element will be moved to the left as viewed in Figure 1, with the shiftable member ends 27 and 28 occupying the position shown. In high gear it will be obvious that the shiftable member end 27 will move to a position wherein it holds the switch arm 165 in engagement with the contact 164, while the contact across the elements 160 and 161 will be broken. The contact 164 is connected by the wire 163 to the contact 155 and this contact is engageable with the switch arm 154 only when the vehicle speed is below a predetermined point, for example, 12 miles per hour. Accordingly when the vehicle is in high gear the circuit across elements 160 and 161 remains broken and the circuit which includes elements 164 and 165 will be completed when the vehicle is traveling below the predetermined speed referred to. The purpose of the latter elements is to enable the operator to take his foot off the accelerator when the vehicle is in high gear and utilize the engine as a brake, the releasing of the accelerator pedal above the predetermined speed referred to having no effect on the clutch motor since the solenoid 50 (Figure 6) will be deenergized and the valve 48 will be in closed position.

Thus, if the operator intends bringing the vehicle to a stop while traveling in high gear, he will release the accelerator pedal to move the follow-up valve mechanism in Figure 6 to the clutch releasing position and depress the brake pedal of the vehicle. The clutch elements will remain in engagement and the engine will serve as a brake until the vehicle speed is decelerated to the predetermined speed referred to, whereupon the switch arm 154 will engage the contact 155, thus completing a circuit from the source through wires 151 and 153, switch 154 and contact 155, wire 163, elements 164 and 165, grounds 162 and 158, and thence through the solenoid 50 and back to the source through wire 157. The solenoid 50 thus will be energized to open the valve 48, whereupon the clutch motor will be immediately connected to the source of vacuum and the clutch will be disengaged preparatory to bringing the vehicle to a complete stop.

From the foregoing it will be apparent that of the normal functions of the clutch and gear shift mechanism are taken care of by the proper operations of the elements described. The principal object of the present invention is to provide novel means whereby a shift down from high gear to second gear may be effected. This operation normally is carried out by "double-clutching" which consists in the steps of depressing the clutch pedal, moving the gear shift to neutral position, releasing the clutch pedal and accelerating the vehicle engine to a substantial extent, then depressing the clutch pedal, making the shift into second gear, and immediately releasing the clutch pedal and depressing the accelerator pedal. These functions are necessary since, as is well known, engine speed is much higher in second gear for a given vehicle speed than is true in high gear and unless the clutch elements are approximately synchronized by accelerating the engine speed prior to engagement of the clutch after the shift down into second gear has been made, a sharp jerking or lunging of the vehicle will occur. In the copending application of Edward G. Hill and Henry W. Hey, Serial No. 372,410 there is disclosed and claimed a novel mechanism operative in connection with the lever mechanism shown in Figure 3 of the present application for checking independent turning movement of the lever 72 at a much earlier point and simultaneously starting the acceleration of the vehicle engine in order to provide for clutch element synchronization prior to automatic engagement of the clutch elements upon the depression of the accelerator pedal. The substantially ealier checking of the lever 72 and consequently of the clutch elements is accomplished by energizing a solenoid corresponding to the solenoid 99 of the present application to swing to operative position a cam member corresponding to the member 93.

The energizing of such a solenoid is dependent upon the gear set being in second gear. The releasing of the clutch pedal, with the vehicle traveling at substantial speed in high gear, will not result in energization of the clutch motor for the reasons stated, the valve corresponding to the valve 48 being closed under such conditions. The energizing of a solenoid corresponding to the solenoid 50 to open the main control valve is dependent upon the mounting of switch contacts in the gear shift lever and the making of the gear shift lever of two relatively movable parts whereby initial movement of the knob of the gear shift lever will close a circuit to open the solenoid valve of the clutch control mechanism and thus provide for clutch disengagement preparatory to making the shift back into second gear. In actual practice it has been found that the manufacture of the two-part gear shift handle, the provision of the switch device therein and the wiring of the switch device involves quite substantial expense.

It was proposed to materially simplify such arrangement and render it less expensive to manufacture by providing the second and high gear shift rail with switch contacts adapted to be closed upon initial movement of said shift rail to energize the solenoid of the clutch control mechanism. While such an arrangement is wholly practicable and has been successfully operated, it has one disadvantage from a practical standpoint. There is a very limited free play of the high gear shift rail when such rail is initially moved from the high gear position and this limited movement was utilized to effect the closing of the switch mechanism referred to, such mechanism comprising the elements 160 and 161 as described above. The slight limited free movement of the high gear shift rail requires the placing of the contact 160 very close to the sleeve 161 since if this switch is not closed during the free movement of the high gear shift rail, it is necessary to impart very substantial force to the high gear shift rail to actually start the movement out of high gear before the contact 160 would be engaged. This required the exertion of substantial force by the operator on the gear shift lever, it being remembered that under the conditions being considered the clutch elements are in engagement. If the contact 160 is arranged sufficiently close to the sleeve 161 to be engaged thereby during free movement of the high gear shift rail, the elements 160 and 161 are so close that the normal jarring and vibration occurring incident to the driving of the vehicle would sometimes bring the elements 160 and 161 into contact when such action was not desirable.

Of course, arrangements might be made very readily for increasing the free movement of the high gear shift rail, but this would involve costly changes in the transmission. We have found that all of the difficulty involved in the use of the elements 160 and 161 may be completely removed by the addition of the simple cheap switch mechanism 172 (Figure 7) associated with the gear shift motor.

Assuming that the vehicle is traveling in high gear at a substantial speed and the operator desires to shift back from high to second gear without losing substantial momentum, for example, when climbing a steep hill, it merely will be necessary for him to release the accelerator pedal and simultaneously exert a slight force on the gear shift handle 34 to start to move this handle out of the high gear position. The releasing of the accelerator pedal will place the valves 38 and 51 (Figure 6) in the clutch releasing position, but this operation in itself will not effect the releasing of the clutch elements since the valve 48 (Figure 6) will be in closed position. However, initial movement of the handle 34 out of the high gear position will transmit movement to the actuating rod 33 (Figures 1 and 7) to move this rod and the valve 111 to the left of the position shown in Figure 7 to initially connect the vacuum passage 113 to the port 119 and thus start to exhaust air from the left hand end of the motor cylinder. The piston 110 will not immediately partake of any appreciable movement owing to the great force which must be exerted to move the crank 32 (Figure 1) while the clutch elements are engaged. However, the initial drop in pressure in the left hand end of the cylinder 102 (Figure 7) will correspondingly exhaust air from the bulb 175, whereupon external air pressure will collapse this bulb to bring the screw 179 into engagement with the thimble 173. Under such conditions a circuit will be immediately closed through wires 151, 153, 159 and 180, across the screw 179 and thimble 173, through the motor 31 to the ground 181, thence through ground 158 and solenoid 50, and thence back to the source through wire 157.

Accordingly it will be apparent that an initial reduction in pressure in the left hand end of the motor cylinder 102 incident to initial movement of the gear shift lever 34 out of the high gear position will energize the solenoid 50 to open the valve 48, and the valves 38 and 51 having been previously placed in the clutch releasing position, the clutch will be immediately disengaged to permit movement of the gear shift lever 34 out of the high gear position into the second gear position, this complete operation being possible in present day synchronizing transmissions, as will be apparent. Accordingly the gear set will be in second gear with the engine idling and the accelerator pedal released and with the clutch elements disengaged.

Accordingly the operator is ready to immediately depress the accelerator pedal and accelerate the engine and effect clutch engagement. It will be apparent that with the control mechanism to be referred to, clutch engagement would take place by operation of the valve mechanism in Figure 6 through the lever mechanism shown in Figure 3 in the same manner as for the normal shifts into first, second and high gears.

However, under the conditions being considered, the circuit will be closed through the solenoid 99. When the shift was made into second gear with the vehicle traveling above the predetermined speed referred to, a circuit will have been completed through wires 151 and 153, switch arm 154 and contact 156, wire 171, switch 170, contact 168, wire 167 and thence through the solenoid 99 and back to the source through wires 166 and 151. Accordingly the solenoid 99 will be energized and the cam member 93 will be moved to the operative position shown in Figure 3 with the cam end 94 arranged much closer to the adjacent end of the screw 95 than the end of the projection 85 is arranged with respect to the nearest point on the arm 82.

Accordingly the operator, after having made the shift back from high to second gear, will depress the accelerator pedal with the lever mechanism positioned as shown in Figure 3. Initial depression of the accelerator pedal will transmit movement through the rod 74 (Figures 2 and 3) to move this rod to the right and swing the lever 72 about its pivot 71 until the head of the screw 95 contacts with the cam end 84. During this period the rod 58, having its point of connection with the lever 72 about twice as far from the pivot 71 as does the rod 74, the valve 51 (Figure 6) will move approximately twice as fast as the rod 74. Contact between the screw 95 and cam end 94, however, will take place a substantial distance in advance of engagement of the clutch elements through operation of the valve mechanism of Figure 6, and continued depression of the accelerator pedal will cause the levers 70 and 72 to turn substantially as a unit about the throttle shaft 16.

The swivel 73 (Figure 3) is only about half as far from the shaft 16 as is the pivot point 75, and accordingly beyond the point at which the cam end 94 takes up the screw 95, the valve 51 (Figure 6) will move only about half as fast as the rod 74.

As explained in detail in the prior patent to Edward G. Hill, No. 1,964,693, referred to above, the clutch elements will have their movement checked at the point of initial engagement by the functioning of the diaphragm 61 (Figure 6). This is due to the fact that initial contact of the clutch elements retards their speed and consequently retards the speed of the clutch motor piston 29 (Figure 2) thus resulting in an increase in pressure in the clutch motor and in the chamber 65 through the passage 67 thus releasing the spring 68 to a greater extent and permitting it to move the valve 38 to a point wherein the ports 42 will be cut off or nearly cut off from communication with the air passage 54 (Figure 6).

This checking of the clutch elements will take place under any conditions whenever the clutch elements initially contact. With the present apparatus, however, the changing of the effective leverage through which the rod 58 operates the clutch control valve 51 causes the latter valve to start to move quite slowly well in advance of the point at which initial engagement of the clutch elements takes place. This change of leverage, however, causes a given rate of movement of the rod 74 by the accelerator to turn the lever 70 about the axis of the throttle shaft 16 at a substantial speed with respect to the speed of movement of the valve operating rod 58 and accordingly the throttle will be relatively rapidly opened. Moreover, opening movement of the throttle obviously takes place much earlier than when the cam 93 is inoperative, that is, when the solenoid 99 is deenergized.

Thus it will be apparent that after the shift has been completed into second gear from high gear, the operator will depress the accelerator in the usual manner but the results which follow such operation are wholly different than when a normal shift is being made. Clutch element engagement will take place much later with respect to opening movement of the throttle, or stated conversely, the throttle will be substantially opened to greatly accelerate the engine speed before engagement of the clutch elements takes place. This operation results in a speeding up of the engine-driven element of the clutch, thus substantially synchronizing the speed of the clutch elements prior to engagement thereof. Thus the jerking or lunging of the vehicle upon engagement of the clutch after a shift down from high gear to second gear is eliminated, and the operation takes place fully automatically.

From the foregoing it will be apparent that the present mechanism in its entirety provides for the easy power shifting of the gears of a motor vehicle together with automatic operation of the clutch through operation of the accelerator pedal. It also will be apparent that the apparatus provides for a smooth and efficient shift down from high to second gear with a smooth engagement of the clutch elements after such shift has been made. It is also pointed out that the necessity for altering the shift lever, installing a switch therein and providing wiring in or around the steering column for such switch, as must be done in the apparatus of the Hill and Hey application Serial No. 372,410 referred to above, is eliminated. The releasing of the clutch pedal when in high gear and above the predetermined speed referred to, followed by slight initial movement of the gear shift lever 34 out of the high gear position, results in initial energization of the shift motor 31 to energize the solenoid 50 (Figure 6) and thus render the follow-up control valve mechanism effective for immediately disengaging the vehicle clutch to permit an immediate continuation of the shifting movement out of high gear. This is accomplished without any necessity for having to build up a great differential pressure in the shifting motor 31 in order to bring the contact 160 and sleeve 161 into engagement with each other. The circuit through the latter elements is in parallel with the circuit through the switch device 172, and as soon as appreciable movement of the shift rail end 27 out of high gear has taken place, the control circuit for the solenoid 50 will be established through the elements 160 and 161, after which the switch device 172 becomes inoperative for controlling the solenoid 50. Thus if the operator should start the shift out of high gear and bring the movement of the gear shift lever to a stop for any reason, the establishment of equal pressures in the ends of the shift motor 31 will not disturb the circuit through the solenoid 50.

It will be understood that the switch device 172 is auxiliary to the elements 160 and 161, permitting these elements to be arranged sufficiently far apart to prevent accidental engagement without making it necessary for the motor 31 to be substantially energized to move the sleeve 161 into engagement with the contact 160. The elements 160 and 161, without the parallel circuit through the switch device 172, provide a wholly operative mechanism but the use of the switch device 172 is preferred for the reasons referred to.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. In combination with a motor vehicle power plant having a clutch and a transmission; a clutch operating power device, a control mechanism operable for effecting energization of said power device to disengage the clutch, and a gear shifting mechanism comprising a motor, said control mechanism comprising a device subject to control in accordance with initial energization of said motor to an extent insufficient to effect operation thereof to operate said control mechanism to effect operation of said power device to disengage the clutch.

2. In combination with a motor vehicle power plant having a clutch and a transmission; a clutch operating power device, a control mechanism operable for energizing said power device, and a gear shifting mechanism comprising a differential fluid pressure motor, said control mechanism comprising a pressure operated device responsive to an initial change of pressure in said motor to cause said control mechanism to energize said power device and disengage the clutch.

3. In combination with a motor vehicle power plant having a clutch and a transmission; a differential pressure operated clutch operating power device, a control mechanism for establishing differential pressures in said power device to disengage the clutch, and a gear shifting mechanism comprising a differential pressure operated motor, said control mechanism comprising an electrical device energizable to establish differential pressures in said power device to disengage the clutch, said control mechanism further comprising a pressure operated switch device responsive to initial establishment of differential pressure in said motor to close the circuit through said electrical device.

4. In combination with a motor vehicle power plant having a clutch and a transmission; a clutch control mechanism, means operable under predetermined conditions for rendering said clutch control mechanism operative for disengaging the clutch, a gear shifting mechanism comprising a motor, and auxiliary control means operable under a different predetermined condition and upon a given initial energization of said motor to an extent insufficient to effect operation thereof for effecting operation of said clutch control mechanism for disengaging the clutch.

5. In combination with a motor vehicle power plant having a clutch and a transmission; a clutch operating mechanism connected to the clutch, a control mechanism for said clutch operating mechanism, means operable under predetermined conditions for rendering said control mechanism operative for controlling said clutch operating mechanism to disengage the clutch, a gear shifting mechanism comprising a motor, and auxiliary means operable under a different predetermined condition and upon a given initial energization of said motor to an extent insufficient to effect operation thereof for effecting operation of said control mechanism for controlling said clutch operating mechanism to disengage the clutch.

6. In combination with a motor vehicle power plant having a clutch and a transmission; a clutch operating power device, means operable under predetermined conditions for energizing said power device to disengage the clutch, a gear shifting mechanism comprising a motor, and auxiliary means operable under a different predetermined condition and upon a given initial energization of said motor to an extent insufficient to effect operation thereof for energizing said power device to disengage the clutch.

7. In combination with a motor vehicle power plant having a clutch and a transmission; a clutch operating power device, a control mechanism therefor, means operable under predetermined conditions for rendering said control mechanism operative for energizing said power device to disengage the clutch, a gear shifting mechanism comprising a motor, and auxiliary means operable under a different predetermined condition and upon a given initial energization of said motor to an extent insufficient to effect operation thereof for effecting operation of said control mechanism for energizing said power device to disengage the clutch.

8. In combination with a motor vehicle power plant having a clutch and a transmission; a fluid pressure operated power device connected to the clutch, means operable under predetermined conditions for connecting said power device to a source of pressure differential for disengaging the clutch, a gear shifting mechanism comprising a fluid pressure operated motor, and auxiliary control means operable under a different predetermined condition and upon the initial establishment of differential pressure in one end of said motor to an extent insufficient to effect operation thereof for connecting said power device to said source for disengaging the clutch.

9. In combination with a motor vehicle power plant having a clutch and a transmission; a fluid pressure operated power device connected to the clutch, a control valve mechanism for said power device, means operable under predetermined conditions for operating said valve mechanism to connect said power device to a source of pressure differential to disengage the clutch, a gear shifting mechanism comprising a fluid pressure operated motor, and auxiliary means operable under a different predetermined condition and upon initial establishment of differential pressure in one end of said motor to an extent insufficient to effect operation thereof for connecting said power device to said source for disengaging the clutch.

10. In combination with a motor vehicle power plant having a clutch, and a transmission including a member shiftable in opposite directions from a neutral position into operative positions to provide different transmission ratios; a fluid pressure operated power device connected to the clutch, means operable under predetermined conditions for connecting said power device to a source of pressure differential to disengage the clutch, a gear shifting mechanism comprising a double acting fluid pressure operated motor for moving said shiftable member, and auxiliary means operable under a different predetermined condition upon the establishment of initial differential pressure in one end of said motor to an extent insufficient to effect operation thereof, with said shiftable member in a given position, for connecting said power device to said source to disengage the clutch.

11. In combination with a motor vehicle power plant having a clutch, and a transmission provided with a member shiftable in opposite directions from a neutral position into operative positions for providing different gear ratios; a fluid pressure operated power device connected to the clutch, control valve mechanism for said power device, means operable under predetermined conditions for operating said valve mechanism to connect said power device to a source of pressure differential to disengage the clutch, a gear shifting mechanism comprising a double-acting differential fluid pressure operated motor for moving said shiftable member, and auxiliary means operable under a different predetermined condition, with said shiftable member in one of its operative positions, and upon initial connection of one end of said motor to said source to establish differential pressures in said motor insufficient to effect operation thereof, for connecting said power device to said source to disengage the clutch.

12. In combination with a motor vehicle power plant including an engine having a throttle, a clutch and a transmission; a clutch operating mechanism connected to the clutch, a control mechanism for said clutch operating mechanism, means operatively connected for operation with the engine throttle and operative under predetermined conditions when the throttle is in idling position for rendering said control mechanism operative for controlling said clutch operating mechanism to disengage the clutch, a gear shifting mechanism comprising a motor, and auxiliary means operable under a different predetermined condition and upon a given initial energization of said motor for rendering said control mechanism operable for controlling said clutch operating mechanism to disengage the clutch.

13. In combination with a motor vehicle power plant including an engine having a throttle, a clutch and a transmission; a clutch-operating power device, a control mechanism for said power device, means operatively connected to the engine throttle and operable under predetermined conditions when the throttle is in idling position for rendering said control mechanism operative for energizing said power device to disengage the clutch, a gear shifting mechanism comprising a motor, and auxiliary means operable under a different predetermined condition when the throttle is in idling position and upon a given initial energization of said motor for rendering said control mechanism operable for energizing said power device to disengage the clutch.

14. In combination with a motor vehicle power plant including an engine having a throttle, a clutch and a transmission; a fluid pressure operated power device connected to the clutch, a control valve mechanism for said power device, means operatively connected to the throttle and operative under predetermined conditions when the throttle is in idling position for operating said valve mechanism to connect said power device to a source of pressure differential to disengage the clutch, a gear shifting mechanism comprising a fluid pressure operated motor, and auxiliary means operable under a different predetermined condition when the throttle is in idling position and upon initial establishment of differential pressure in one end of said motor for connecting said power device to said source for disengaging the clutch.

15. In combination with a motor vehicle power plant including an engine having an accelerator-operated throttle, a clutch, and a transmission including a member shiftable in opposite directions from a neutral position into operative positions for providing different gear ratios; a fluid pressure operated power device connected to the clutch, control valve mechanism for said power device, means operatively connected to the engine throttle and operable under predetermined conditions when the throttle is in idling position for operating said valve mechanism to connect said power device to a source of pressure differential to disengage the clutch, a gear shifting mechanism comprising a double-acting differential fluid pressure operated motor for moving said shiftable member, and auxiliary means operable under a different predetermined condition when the throttle is in idling position with said shiftable member in one of its operative positions and upon initial connection of one end of said motor to said source for connecting said power device to said source to disengage the clutch.

16. In combination with a motor vehicle power plant including an engine having a throttle, a clutch, and a transmission; a clutch-operating power device, a control mechanism therefor connected to the throttle to be moved thereby to a position tending to connect said power device to a source of power to disengage the clutch when the throttle is in idling position, cut-off means between said control mechanism and said source movable to connect said control mechanism to or disconnect it from said source, means operable under predetermined conditions for rendering said cut-off means inoperative for disconnecting said control mechanism from said source, a gear shifting motor, and auxiliary means operative under a different predetermined condition and upon a given initial energization of said motor for rendering said cut-off means ineffective for disconnecting said control mechanism from said source.

17. In combination with a motor vehicle power plant including an engine having a throttle, a clutch, and a transmission; a fluid pressure operated power device connected to the clutch, control valve mechanism for said power device connected to the engine throttle to be moved thereby to a position tending to connect said power device to a source of pressure differential to disengage the clutch when the throttle is in idling position, a cut-off valve between said control valve mechanism and said source movable to connect said valve mechanism to or disconnect it from said source, means operable under predetermined conditions for rendering said cut-off valve inoperative for disconnecting said valve mechanism from said source, a fluid pressure operated gear shifting motor, and auxiliary means operative under a different predetermined condition and upon a given initial connection of said motor to said source for rendering said cut-off valve ineffective for disconnecting said control mechanism from said source.

18. In combination with a motor vehicle power plant including an engine having a throttle, a clutch, and a transmission having a member shiftable in opposite directions from a neutral position into operative positions to provide different transmission ratios; a fluid pressure operated power device connected to the clutch, control valve mechanism for said power device connected to the throttle to be moved thereby to a position tending to connect said power device to a source of pressure differential to disengage the clutch when the throttle is in idling position, a cut-off valve between said valve mechanism and said source, means for maintaining said cut-off valve in open position except when the transmission shiftable member is in a given operative position, a fluid pressure operated gear shifting motor, and auxiliary means operative when the transmission shiftable member is in said given position and upon a given initial energization of said motor for opening said cut-off valve.

19. In combination with a motor vehicle power plant including an engine having a throttle, a clutch, and a transmission having a member shiftable in opposite directions from a neutral position into operative positions to provide different transmission ratios; a fluid pressure operated power device connected to the clutch, a control valve mechanism for said power device connected to the throttle to be moved thereby to a position tending to connect said power device to a source of pressure differential to disengage the clutch when the throttle is in idling position, a cut-off valve between said valve mechanism and said source, means for maintaining said cut-off valve in open position except when the transmission shiftable member is in a given operative position, a fluid pressure operated gear shifting motor, a circuit energizable for opening said cut-off valve and including a switch, and means for closing said switch when said transmission shiftable member is in said position and upon a given initial energization of said motor.

20. In combination with a motor vehicle power plant including an engine having a throttle, a clutch, and a transmission having a shiftable member movable in opposite directions from a neutral position into operative positions to provide different gear ratios one of which is high gear; a clutch operating power device, a control mechanism therefor connected to the throttle to be moved thereby to a position tending to connect said power device to a source of power to disengage the clutch when the throttle is in idling position, cut-off means between said control mechanism and said source, means biasing said cut-off means to closed position, means for holding said cut-off means in open position under all conditions except when the transmission shiftable member is in high gear position, a gear shifting motor for moving said shiftable member, and auxiliary means operative when the shiftable member is in high gear position and upon an initial energization of said motor tending to move said shiftable member out of high gear position for opening said cut-off means.

21. In combination with a motor vehicle power plant including an engine having a throttle, a clutch, and a transmission having a shiftable member movable in opposite directions from a neutral position into operative positions to provide different gear ratios one of which is in high gear; a clutch operating power device, a control mechanism therefor connected to the throttle to be moved thereby to a position tending to connect said power device to a source of power to disengage the clutch when the throttle is in idling position, cut-off means between said control mechanism and said source, means biasing said cut-off means to closed position, means for holding said cut-off means in open position under all conditions except when the transmission shiftable member is in high gear position, a gear shifting motor for moving said shiftable member, and an electric switch movable to closed position to complete a circuit for opening said cut-off means, said switch being operative for completing said circuit when said shiftable member is in high gear position and upon an initial energization of said motor tending to move said shiftable member out of high gear position.

22. In combination with a motor vehicle power plant including an engine, a clutch and a transmission having a shiftable member movable in opposite directions from a neutral position into operative positions to provide different gear ratios; a power device connected to the clutch, a control mechanism for said power device movable to a position tending to connect said power device to a source of power to disengage the clutch, cut-off means between said control mechanism and said source of power, means biasing said cut-off means to closed position, electro-magnetic means for holding said cut-off means in open position under all conditions except when the transmission shiftable member is in a given position, a fluid pressure operated motor for moving said shiftable member, and means for energizing said electro-magnetic means when said shiftable member is in said position, said last named means comprising a pair of switch contacts, and a collapsible member carrying one of said contacts and communicating with one end of said motor whereby initial energization of said motor when said shiftable member is in said position engages said contacts to energize said electro-magnetic means.

23. In combination with a motor vehicle power plant including an engine, a clutch, and a transmission having a shiftable member movable in opposite directions from a neutral position into operative positions to provide different gear ratios one of which is high gear; a fluid pressure operated power device connected to the clutch, control valve mechanism for said power device movable to a position tending to connect said power device to a source of pressure differential to disengage the clutch, a cut-off valve between said valve mechanism and said source, means biasing said cut-off valve to closed position, electro-magnetic means for holding said cut-off valve in open position under all conditions except when the transmission shiftable member is in high gear, a fluid pressure operated motor for moving said shiftable member, and auxiliary means operable when the shiftable member is in high gear position for energizing said electro-magnetic means, said auxiliary means comprising a pair of switch contacts, and a collapsible bulb carrying one of said contacts and communicating with one end of said motor whereby the initial establishment of differential pressures in said motor when the shiftable member is in high gear position engages said contacts to energize said electro-magnetic means.

24. In combination with a motor vehicle power plant including an engine having a throttle, a clutch, and a transmission having a shiftable member movable in opposite directions from a neutral position into operative positions to provide different gear ratios one of which is high gear, a fluid pressure operated power device connected to the clutch, a follow-up control valve mechanism for said power device operable by the throttle and movable to a position, when the throttle is in idling position, to connect said power device to a source of pressure differential to disengage the clutch and movable as the throttle is opened to release the clutch elements for movement approximately to the point of initial engagement, check the movement of the clutch elements, and then release them for movement into operative engagement, a cut-off valve between said valve mechanism and said source and biased to closed position, electro-magnetic means for opening said cut-off valve, a circuit completed for energizing said electro-magnetic means under all conditions except when the transmission shiftable member is in high gear position, a fluid pressure operated gear shifting motor for moving said shiftable member, and auxiliary means operative when the shiftable member is in high gear position and upon an initial energization of said motor tending to move said shiftable member out of high gear position for energizing said electro-magnetic means.

25. Apparatus constructed in accordance with claim 24 provided with means constructed and arranged to control said valve mechanism to check the movement of the clutch elements at a substantially earlier point when said shiftable member is moved from the high gear position to its other position and the throttle is opened.

26. Apparatus constructed in accordance with claim 24 wherein said auxiliary means comprises a parallel circuit for said electro-magnetic means comprising a pair of contacts, and a flexible bulb carrying one of said contacts and communicating with said motor whereby initial establishment of differential pressures in said motor preparatory to a shift out of high gear position engages said contacts.

27. In combination with a motor vehicle power plant including an engine having a throttle, a clutch, and a transmission having a shiftable member movable in opposite directions from a neutral position into operative positions to provide different gear ratios one of which is high gear, a fluid pressure operated power device connected to the clutch, a follow-up control valve mechanism for said power device operable by the throttle and movable to a position, when the throttle is in idling position, to connect said power device to a source of pressure differential to disengage the clutch and movable as the throttle is opened to release the clutch elements for movement approximately to the point of initial engagement, check the movement of the clutch elegagement, and then release them for movement into operative engagement, a cut-off valve between said valve mechanism and said source and biased to closed position, electro-magnetic means for opening said cut-off valve, a circuit completed for energizing said electro-magnetic means under all conditions except when the transmission shiftable member is in high gear position, a fluid pressure operated gear shifting motor for moving said shiftable member, control mechanism for said motor comprising a follow-up valve mechanism and a handle connected thereto, and auxiliary means operative when the shiftable member is in high gear position and upon initial movement of said handle for initially establishing differential pressures in said motor for energizing said electro-magnetic means.

28. Apparatus constructed in accordance with claim 27 provided with means constructed and arranged to control said valve mechanism to check the movement of the clutch elements at a substantially earlier point when said shiftable member is moved from the high gear position to its other position and the throttle is opened.

29. Apparatus constructed in accordance with claim 27 wherein said auxiliary means comprises a parallel circuit for said electro-magnetic means, a pair of contacts in said parallel circuit, and a collapsible bulb carrying one of said contacts and communicating with one end of said motor whereby initial establishment of differential pressures therein when the shiftable member is in high gear position collapses said bulb and engages said contacts.

30. In combination with a motor vehicle power plant having a clutch and a transmission; a clutch operating power device, a gear shifting mechanism comprising a motor, a manually operable handle, and a follow-up mechanism connected to be operated by said handle and by said motor whereby the latter is caused to partake of a follow-up action with respect to movement of said handle, and a control mechanism for said power device for energizing the latter to disengage the clutch, said control mechanism comprising a device operable upon an initial energization of said motor independently of operation thereof for rendering said control mechanism effective for energizing said power device.

31. In combination with a motor vehicle power plant having a clutch and a transmission; a clutch operating power device, a gear shifting mechanism comprising a differential fluid pressure motor, a control handle, and a follow-up valve device connected to be operated by said handle and by said motor whereby the latter partakes of a follow-up action with respect to movement of said handle, and a control mechanism for said power device for energizing the latter to disengage the clutch, said control mechanism comprising a pressure operated device subject to pressures in one end of said motor whereby it is operated upon an initial change in pressure therein to cause said control mechanism to energize said power device.

32. In combination with a motor vehicle power plant having a clutch and a transmission; a clutch operating power device, a gear shifting mechanism comprising a differential fluid pressure motor, a control handle, and a follow-up valve device connected to be operated by said handle and by said motor whereby the latter partakes of a follow-up action with respect to movement of said handle, and a control mechanism for said power device for energizing said power device to disengage the clutch, said control mechanism comprising an electrical control circuit having a switch therein, and pressure operated means operable upon initial establishment of differential pressures in said motor to close said switch and render said control mechanism operative for energizing said power device.

HENRY W. HEY.
JEANNOT G. INGRES.